J. O. LUTHY.
SEPARATOR FOR SECONDARY BATTERIES.
APPLICATION FILED SEPT. 29, 1919.
1,331,018.
Patented Feb. 17, 1920.
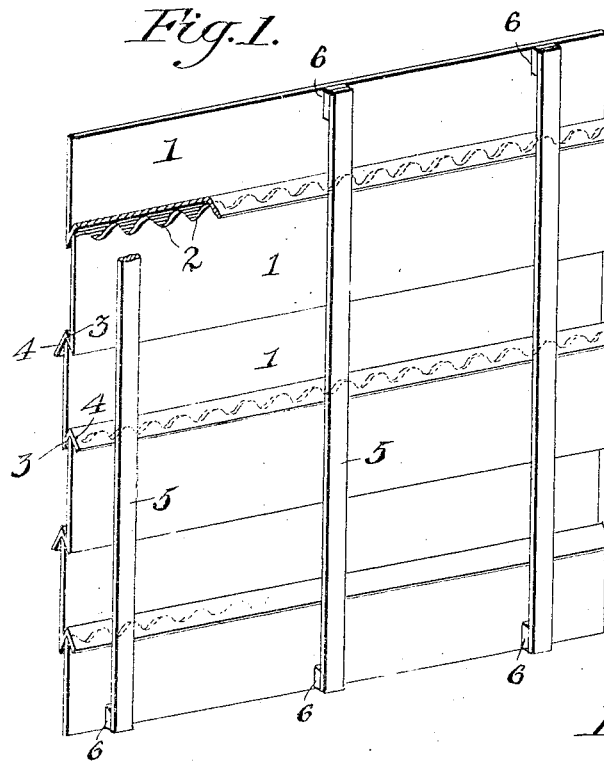
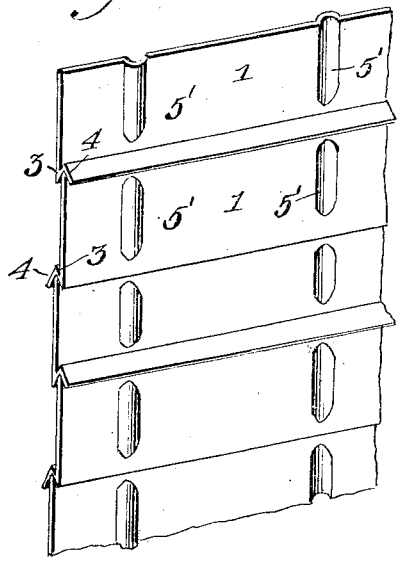
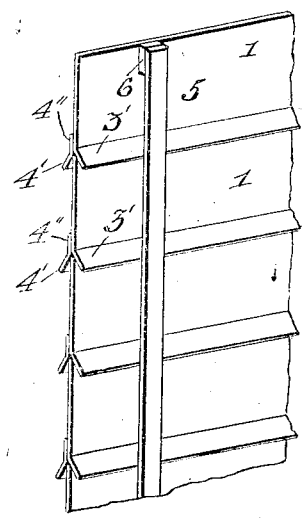
Inventor.
Joseph O Luthy

UNITED STATES PATENT OFFICE.

JOSEPH O. LUTHY, OF SAN ANTONIO, TEXAS.

SEPARATOR FOR SECONDARY BATTERIES.

1,331,018.  Specification of Letters Patent.  Patented Feb. 17, 1920.

Application filed September 29, 1919. Serial No. 327,195.

*To all whom it may concern:*

Be it known that I, JOSEPH O. LUTHY, a citizen of the Republic of Switzerland, residing at San Antonio, county of Bexar, State of Texas, have invented certain new and useful Improvements in Separators for Secondary Batteries; and I do hereby declare the following to be a full, clear, and exact description of the invention, such as will enable others skilled in the art to which it appertains to make and use the same.

The invention relates to separators for secondary batteries and has for its object to provide a simple, cheap and efficient form of device for separating and spacing the plates of secondary or storage batteries that will posses all of the inherent advantages of the separators described and claimed in my copending applications, Serial Nos. 271,353 and 271,354, and which possesses the additional advantages of a simplified construction, a large saving of the material required, and facilitates the operations necessary to build up or construct the separators. To these ends, the invention comprises a separator which is made up of a series of strips of celluloid or like material, which are superposed along longitudinal edges and provided with openings or foraminations adjacent the meeting edges, the openings being protected by double flanges formed on one edge of each plate in hipped relation to constitute a deflector for any active material from the plates which may work loose, but which will, nevertheless, permit free circulation of the electrolyte through the openings.

In the accompanying drawings:

Figure 1 is a perspective view, partly in section, of one form of the device.

Fig. 2 is a fragmentary perspective of a modification.

Fig. 3 is a similar view to that shown in Fig. 2, illustrating a further modification.

Referring to Fig. 1, the numerals 1 indicate a series of longitudinal strips of celluloid or like material which are arranged edge to edge to constitute a substantially flat sheet which forms the separator element. The upper edge of the top strip and the lower edge of the bottom strip are preferably plain. The lower edge of each of the strips, except the bottom strip, is provided with a double fold constituted by flanges 3 and 4, which are disposed in hipped relation along the entire lower marginal edge and constitute a deflector. The upper edge of each of the strips, except the uppermost, is provided with openings or foraminations, which may take the form of flutings, as shown, serrations or holes cut through the body of the strip, or any equivalent form of passages through the strip, which will leave all or a portion of the upper edge of the sheet for engagement with the reëntrant angular or trough-like recess formed by the flanges 3 and 4, to which the upper edge of the subjacent sheet is secured by a suitable cementing agent, such as amyl acetate, or the like, so that when the several strips are assembled and united, they constitute a relatively thin but strong and durable separator element, which, when applied between the battery plates, accurately spaces the latter to a minimum distance apart and provides for a free circulation of the electrolyte through the openings or foraminae, but prevent any loose active material which may be dislodged from the plates passing therethrough, as such loose material will be deflected by the flanges 3 and 4 and caused to settle to the bottom of the container, and thereby prevent short-circuiting of the battery elements.

In order to render the separator rigid in a vertical direction, and to make the same of sufficient thickness to properly space the battery plates, each face of the separator is provided with strengthening ribs or battens 5, preferably made of celluloid or material of the same character as the strip 1, which are provided with spacer blocks 6, 6, where they are united to the flat surface of the strips 1 and are cemented to the edges of the flanges 4 at intermediate points.

In the modified construction shown in Fig. 2, the spacer elements take the form of projections or bosses 5′ which are pressed from opposite sides of the strips and extend a slight distance beyond the outer edges of the flanges 4, and at a sufficient distance from the flat surfaces of the strips 1 to engage the faces of the battery plates and space said plates at proper intervals.

In the modification shown in Fig. 3, the marginal flanges on the lower edges of the strips 1, while preserving the same hipped relation, are formed by a somewhat different arrangement than that shown in Figs. 1 and 2. The flange 3′ is produced by bending the lower edge of the strip outward at an angle of approximately 30 degrees, and the flange 4' is formed of a separate strip which is creased or bent along longitudinal lines, as shown, so that its upper portion 4'' abuts the flat face of the strip 1 and is secured thereto by a suitable cementing agent, such as amyl acetate, and the lower portion forms the flange 4' corresponding to and supplementing the flange 3' on the opposite side of the strip in the general function of deflecting any loose material which might tend to short-circuit the battery plates. It will be understood, of course, that the upper edges of all of the strips 1, except the uppermost, in the forms of the device shown in Figs. 2 and 3, are provided with openings or foraminations to admit free passage of the electrolyte.

From the foregoing description, it will be apparent that a device constructed in accordance with this invention results in a material saving in the substance of which the separators are formed, admits of the latter being constructed and assembled with a minimum of labor and produces a highly efficient separator that permits a free circulation of the electrolyte between the battery elements, but absolutely prevents the passage of any solid material, such as disintegrated portions of the filling of the plates, which would tend to short-circuit the battery elements, by causing such material to be deflected at once to the bottom of the container by means of the deflecting flanges formed on the bottoms of the strip elements which constitute the separator. It will also be noted that the electrolyte is caused to change its course in passing through the foraminated edges of the strips constituting the separator by the flanges 3 and 4, so that should any solid material tend to follow the course of the electrolyte, the change of direction of flow of the latter would cause such solid material to be diverted and directed against the imperforate face of the strip and ultimately to find its way to the bottom of the container.

What I claim is:—

1. A separator comprising a series of strips superposed along longitudinal edges, provided with openings adjacent the meeting edges, and deflectors overlying the openings.

2. A separator comprising a series of strips superposed along longitudinal edges, provided with openings adjacent the meeting edges, and flanges forming a reëntrant angle on each plate overlying the openings.

3. A separator comprising strips having foraminated upper edges and double flanged lower edges to receive the foraminated edge of the subjacent strip, the flanges constituting deflectors, said strips being secured together along their meeting edges.

4. A separator comprising a series of strips superposed and united along longitudinal edges, the uniting edge of one strip being foraminated and the coöperating edge of the adjacent strip having a double angular flange overlying the foraminated edge.

5. A separator comprising a series of strips superposed and united along longitudinal edges, one uniting edge being foraminated and the other having a reëntrant angular flange forming a hipped deflector over the foraminæ of the subjacent strip.

6. A separator strip having one longitudinal edge foraminated and the opposite edge provided with a double flange disposed in hipped relation.

In testimony whereof I affix my signature.

JOSEPH O. LUTHY.